(12) United States Patent
Slevinsky et al.

(10) Patent No.: US 9,937,960 B2
(45) Date of Patent: Apr. 10, 2018

(54) VEHICLE FLOORING SYSTEM

(71) Applicant: VALEDA COMPANY, Fort Lauderdale, FL (US)

(72) Inventors: Paul Edward Slevinsky, Fort Lauderdale, FL (US); Robert Anthony Imbrigiotta, Fort Lauderdale, FL (US)

(73) Assignee: Valeda Company, Fort Lauderdale, FL (US)

( * ) Notice: Subject to any disclaimer, the term of this patent is extended or adjusted under 35 U.S.C. 154(b) by 0 days.

(21) Appl. No.: 15/227,942

(22) Filed: Aug. 3, 2016

(65) Prior Publication Data

US 2017/0050681 A1 Feb. 23, 2017

Related U.S. Application Data

(60) Provisional application No. 62/200,210, filed on Aug. 3, 2015.

(51) Int. Cl.
| | |
|---|---|
| *B60J 7/00* | (2006.01) |
| *B62D 25/20* | (2006.01) |
| *A61G 3/08* | (2006.01) |
| *B60N 2/015* | (2006.01) |
| *B62D 27/02* | (2006.01) |

(52) U.S. Cl.
CPC ....... *B62D 25/2054* (2013.01); *A61G 3/0808* (2013.01); *B60N 2/01558* (2013.01); *B62D 27/023* (2013.01)

(58) Field of Classification Search
CPC . E04F 15/02; E04F 15/04; E04F 15/10; E04F 2201/0115; E04F 15/02033; E04F 15/22; H02G 3/285; Y10T 428/2457; Y10T 428/31989
See application file for complete search history.

(56) References Cited

U.S. PATENT DOCUMENTS

| | | | |
|---|---|---|---|
| 3,995,593 A | 12/1976 | Bowser | |
| 4,266,381 A | 5/1981 | Deller | |
| 6,367,217 B1 * | 4/2002 | Niese | E04F 15/225 52/403.1 |
| 6,860,074 B2 * | 3/2005 | Stanchfield | E04F 15/02005 52/464 |

(Continued)

FOREIGN PATENT DOCUMENTS

| | | |
|---|---|---|
| EP | 1701860 B1 | 4/2005 |
| EP | 1688298 A1 | 8/2006 |

OTHER PUBLICATIONS

International Search Report and Written Opinion in co-pending PCT Application No. PCT/US2016/045442 dated Oct. 20, 2016.

*Primary Examiner* — Kiran B Patel
(74) *Attorney, Agent, or Firm* — Daniel A. Tallitsch

(57) ABSTRACT

A flooring system for a vehicle having a corrugated floor comprises a plurality of flooring panels supported at their undersides by two or more registration members having locating members and other features for aligning the flooring panels vertically, laterally, and longitudinally. The flooring panels each have at least one longitudinally aligned load-bearing structure, such as in integrated track or a universal channel configured to receive a flanged track, filler material, or both. The registration members may have depending support members configured to engage in the valleys of the corrugated vehicle floor.

18 Claims, 7 Drawing Sheets

(56) References Cited

U.S. PATENT DOCUMENTS

| | | | | |
|---|---|---|---|---|
| 7,137,229 B2* | 11/2006 | Pervan | | B27F 1/06 428/50 |
| 7,490,892 B2* | 2/2009 | Sato | | B62D 25/2054 296/184.1 |
| 7,731,271 B2* | 6/2010 | Shelbo | | B21D 13/045 296/182.1 |
| 7,802,415 B2* | 9/2010 | Pervan | | E04F 15/04 428/50 |
| 8,209,928 B2* | 7/2012 | Garcia | | B32B 3/30 52/313 |
| 8,291,661 B2* | 10/2012 | Bengry | | E04F 15/02 52/390 |
| 8,292,356 B2* | 10/2012 | Ishigame | | B62D 21/157 296/193.05 |
| 8,408,566 B2* | 4/2013 | Teichmann | | B62D 21/11 180/274 |
| 8,726,612 B2* | 5/2014 | Lomske | | E04F 15/02044 52/177 |
| 8,850,769 B2* | 10/2014 | Pervan | | B32B 21/00 52/480 |
| 8,919,068 B2* | 12/2014 | Wright | | E04F 15/02183 52/302.1 |
| 9,140,010 B2* | 9/2015 | Pervan | | B27N 3/04 |
| 9,676,549 B2* | 6/2017 | Adams | | B65D 88/744 |
| 9,755,262 B2* | 9/2017 | Ikeda | | H01M 8/2475 |
| 9,758,028 B2* | 9/2017 | Ikeda | | B60K 1/04 |
| 2004/0021331 A1* | 2/2004 | Mills | | B60R 5/04 296/26.09 |
| 2005/0040676 A1* | 2/2005 | Kikuchi | | B62D 25/2072 296/193.07 |
| 2005/0161981 A1* | 7/2005 | Chernoff | | B60H 1/0055 296/193.07 |
| 2006/0165486 A1 | 7/2006 | Ungurean | | |
| 2010/0066125 A1* | 3/2010 | Egawa | | B62D 25/2036 296/193.07 |
| 2015/0108273 A1 | 4/2015 | Oleson | | |
| 2015/0137558 A1* | 5/2015 | Ayuzawa | | B62D 25/2036 296/193.07 |

* cited by examiner

VEHICLE FLOORING SYSTEM

CROSS-REFERENCE TO RELATED APPLICATIONS

This application claims priority to U.S. Patent Application No. 62/200,210, which is incorporated herein in its entirety by reference.

STATEMENT REGARDING FEDERALLY SPONSORED RESEARCH OR DEVELOPMENT

Not Applicable.

THE NAMES OF PARTIES TO A JOINT RESEARCH AGREEMENT

Not Applicable.

INCORPORATION-BY-REFERENCE OF MATERIAL SUBMITTED ON A COMPACT DISC

Not Applicable.

BACKGROUND

Technical Field

The embodiments described and claimed herein relate generally to a floor system of adequate strength for securing wheelchairs, chairs, and/or other cargo, that can be easily and quickly installed into existing vehicles, such as a van, by a single installer.

Background Art

U.S. Pat. No. 6, 595,142 ("the '142 patent") discloses a floor system for a vehicle that is composed of a plurality of parallel substantially plane pipe profiles. Installing the floor system of the '142 patent in a vehicle involves, first, creating a floor plate by interconnecting the pipe profiles, in some cases by their side flanges, and second, attaching the floor plate to the bottom of the vehicle. It is understood that Mobilityworks sells a system covered by the '142 patent under the Smartfloor™ trademark. The '142 patented system has disadvantages. For example, the first step of the '142 patented system (assembly of the floor plate) typically occurs outside of the vehicle. Because the assembled floor plate, which is made up of a plurality of floor profiles, is heavy, multiple people are required to safely move the assembled floor plate into place in the vehicle. This multiplies the installation labor costs as compared to the embodiments disclosed herein. Accordingly, there is a need for an improved floor system for securing wheelchairs in vehicles, wherein the floor profiles are not interconnected and are, instead, installed individually in a vehicle.

BRIEF SUMMARY

The embodiments described and claimed herein solve at least some of the problems of the prior art floor systems. The present embodiments employ several novel features that allow non-interconnected floor planks to be installed in a vehicle by a single installer using registration plates.

In one embodiment, a plurality of registration plates are attached to the vehicle floor at the front edge of the flooring system, the back edge of the flooring system, and various points between (e.g., in front of and behind wheel wells). The registration plates are aligned transversely in the vehicle. The registration plates sit underneath and restrain the floor planks (or panels) in the longitudinal and transverse directions. The registration plates have features such as tabs, which function as spacers between the planks. The registration plates also support the planks so that the top surfaces of the planks are in vertical alignment. The tabs can also hold the planks in vertical alignment through friction or through integrated spring properties and detents. The registration plates also provide increased adhesive bonding surface-area to help improve system strength thru contact with the planks as well as the vehicle floor "valleys".

The embodiments may use one of a plurality of plank profiles, which are preferably created by extrusion: The "integral twin-track" features a profile with full-length mounting tracks (e.g., integrated "L" tracks). The "dual track" features a profile with two full-length grooves that can be populated with standard "L" tracks. The standard mounting track may be secured with a special lock-down bar extrusion that interlocks with load bearing details of the dual track. The grooves can alternately be closed with a low-cost/light weight plastic filler strip that snaps in, leaving a smooth floor that is easier to finish and is less obstructive to the vehicle user.

The embodiments disclosed herein have multiple advantages over the prior art flooring systems. For example, no metal or wood fabrication stations are required. Only low skill labor is required to install the system. There are no installation steps that require multiple people. In fact, one-man installs are feasible with the present embodiments.

Other embodiments, which include some combination of the features discussed above and below and other features which are known in the art, are contemplated as falling within the claims even if such embodiments are not specifically identified and discussed herein.

BRIEF DESCRIPTION OF THE SEVERAL VIEWS OF THE DRAWINGS

These and other features, aspects, objects, and advantages of the embodiments described and claimed herein will become better understood upon consideration of the following detailed description, appended claims, and accompanying drawings where:

Figure 1:
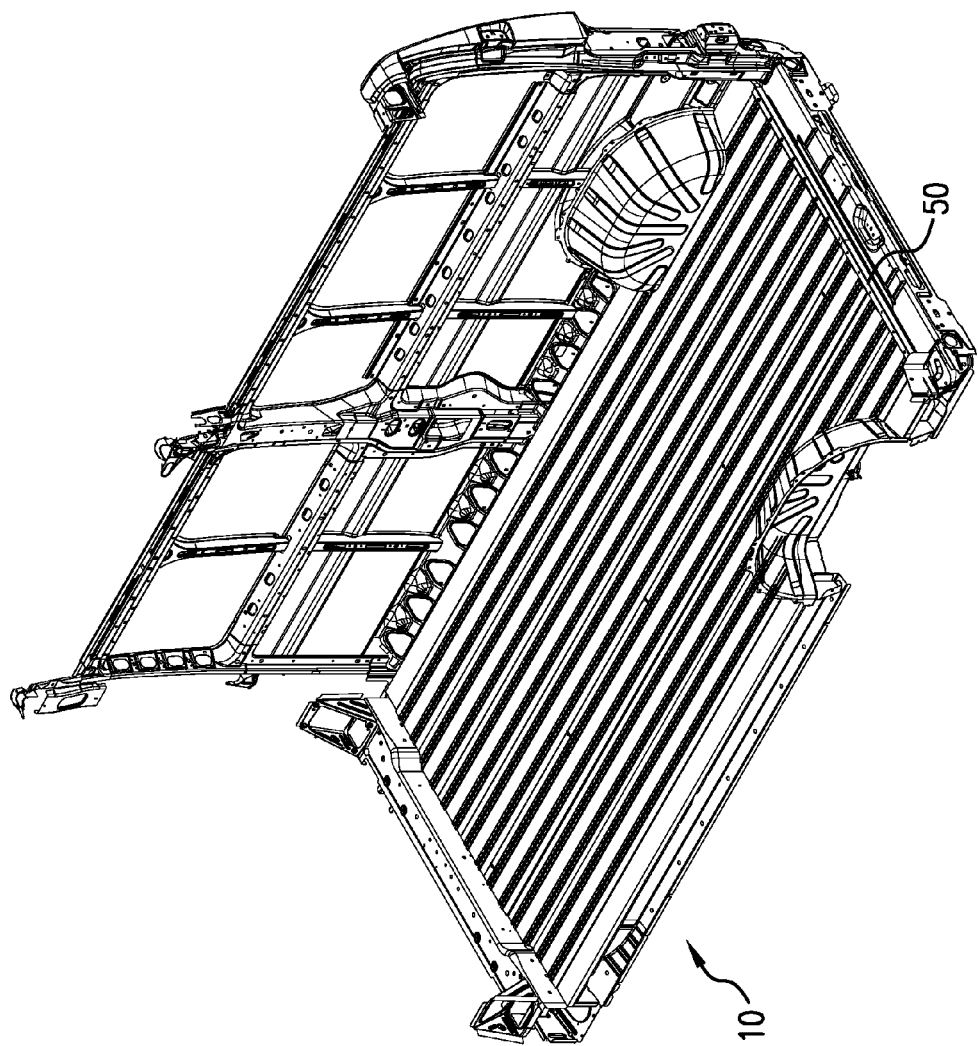
FIG. 1 is perspective view of a first embodiment of a finished flooring system in a vehicle.

It should be understood that the drawings are not necessarily to scale and that the embodiments are sometimes illustrated by graphic symbols, phantom lines, diagrammatic representations and fragmentary views. In certain instances, details which are not necessary for an understanding of the embodiments described and claimed herein or which render other details difficult to perceive may have been omitted. It should be understood, of course, that the inventions described herein are not necessarily limited to the particular embodiments illustrated. Indeed, it is expected that persons of ordinary skill in the art may devise a number of alternative configurations that are similar and equivalent to the embodiments shown and described herein without departing from the spirit and scope of the claims.

Like reference numerals will be used to refer to like or similar parts from Figure to Figure in the following detailed description of the drawings.

DETAILED DESCRIPTION

In a first embodiment shown in FIGS. 1-8 and 11-12, a floor system 10 for a vehicle floor may comprise a plurality of floor panels (or planks) 20, a plurality of registration plates (including a rear registration plate 30 and/or one or more standard registration plates 40), a loadbearing sill 50, a plurality of load spreader plates 60, and various adhesive materials and fasteners. A typical installation of the floor system 10 is described below:

Step 1: The van floor 2 is exposed to reveal metal corrugations. Loose debris should be removed and the floor 2 should be cleaned with a non-residue forming alcohol-based solvent.

Step 2: The rear registration plate 30 depicted in FIGS. 4-6 should be installed on the van floor 2 at the rear of the van using the following method:
 a. Dry fit and check alignment of the rear registration plate 30. The large tabs (or support members) 31 are configured to sit between corrugated ribs 4 on the vehicle floor 2.
 b. Bend registration tabs 32 up.
 c. Peel back contact pressure adhesive tape 33 located on the underside of one or more of the large tabs 31.
 d. Apply a generous amount of mastic or other adhesive (such as a modified silane polymer) to each rib (peak) 4 of the corrugated flooring 2 in the region where the rear registration plate 30 is to be located and/or the remaining surface on the undersides of large tabs 31.
 e. Permanently position the rear registration plate 30 in the desired location at the rear of the van.
 f. Drill all pilot holes 34 indicated in rear registration plate 30 though vehicle floor 2 for later use in mounting bolts as alternate/redundant load-paths.

Step 3: Install one or more standard registration plates 40, shown in FIGS. 7-8, using essentially the same steps as the rear registration plate 30 (without drilling pilot holes) in the locations indicated in FIG. 2. Bend up all of the alignment tabs 42 on only the forward-most standard registration plate 40 (the one at the end opposite the rear registration plate 30). In the present embodiment, only the front and rear registration plates 40, 30 provide lateral alignment of the installed planks 20 with the bent up tabs 42, 32.

The registration plate 30, 40 designs include several key features. For instance, they each include bendable locating tabs 32, 42 that register and align the floor extrusion planks while maintaining minimal separation. The tabs are profiled with a neck 32a, 42a that ensures bending occurs in the specific region and with adequate force using common tools such as a screw driver or pliers. The bend can also be easily reversed by applying a thin metal scraper blade between the edges of the extruded panels 20 and registered against the recess 32b, 42b, introduced into the extreme end of the tab 32, 42.

The registration plates 30, 40 also include vents 35, 45 which allow optimal atmospheric curing for the adhesive. These vents 35, 45 also limit the bead-width of adhesive and provide a path for moisture in the ambient air to react with it.

Adhesive windows 36, 46 are provided on the registration plates 30, 40 in the areas that contact the floor ribs 4 of the vehicle, thus allowing direct bonding between the ribs 4 and the floor extrusion planks 20 and optimizing the strength of the system.

Central ports 37, 47 are added to all the contact tabs 31, 41 that are bonded to the vehicle floor valleys 6 located between the ribs 4. The tabs 31, 41 are designed to avoid direct contact with the valleys 6 and maintain optimal spacing of roughly 1.5 mm for the adhesive layer. The central ports 37, 47 can be used to inject adhesive with the applicator nozzle so that it propagates outward in the event that insufficient amounts of adhesive were applied prior to positioning. Lastly, the central ports 37, 47 provide a path for moisture in the ambient air to react with the adhesive.

Stand-offs 38, 48 are strategically located to elevate the floor extrusion planks 20 from the registration plates 30, 40 and to provide minimal required adhesive between the mating surfaces. The stand-offs 38, 48 were introduced to the design so that they take advantage of the existing forming operations and require no secondary operations.

Note that the rear registration plate 30 may differ from the standard registration plate 40 in that it could have the following added features:
 A) Vertical lip 39 used to align the extrusion planks 20 longitudinally.
 B) Access windows 39a cut into the vertical lip 39 to facilitate insertion of the lock-down bar 22b after dual (universal) plank installation 20b.
 C) Pilot holes 34 to position and guide the drilling operation for "chicken bolt" installation.

Figure 2:
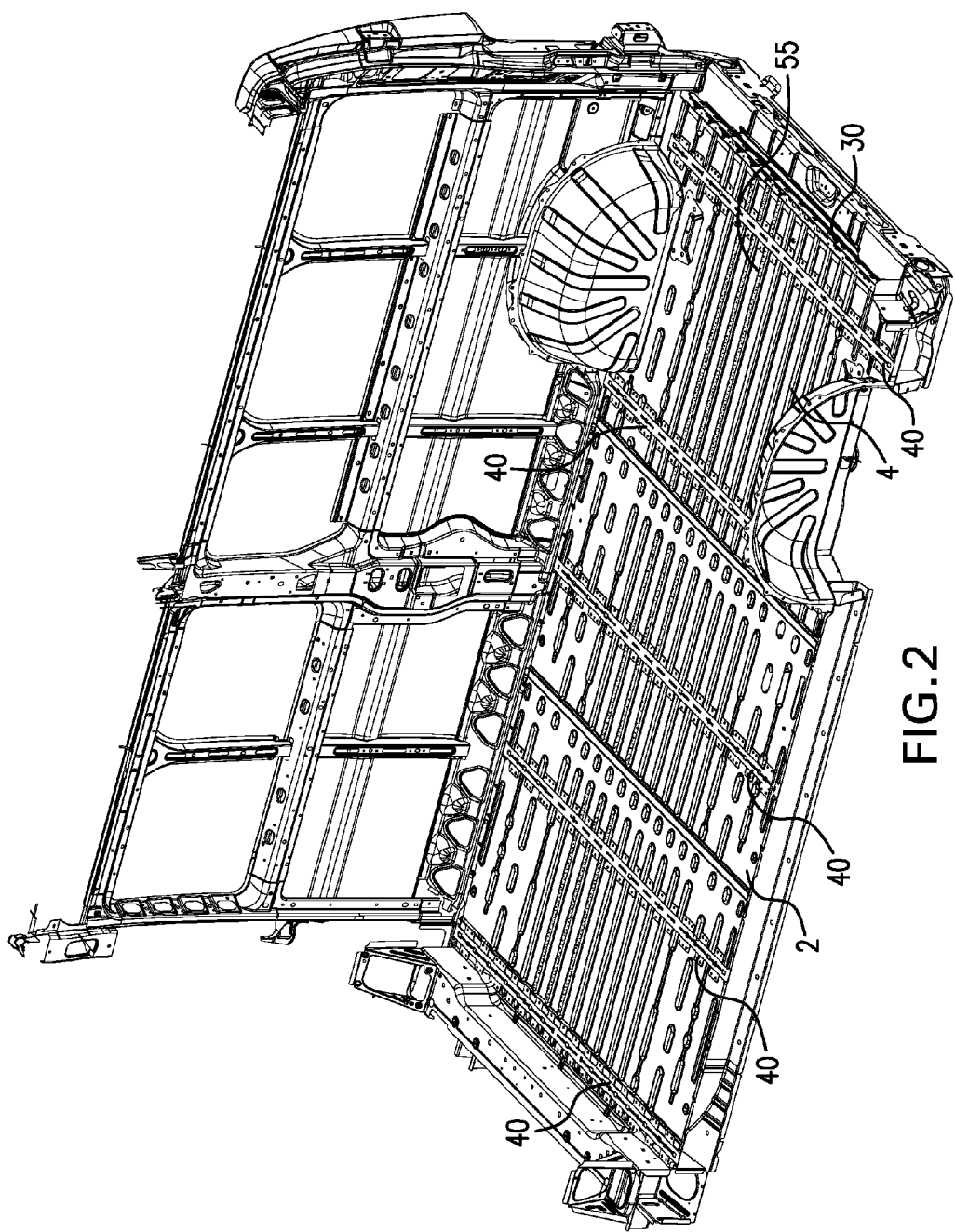
FIG. 2 is a perspective view of the first embodiment of the flooring system in a vehicle prior to installation of a first flooring panel.
Figure 3:
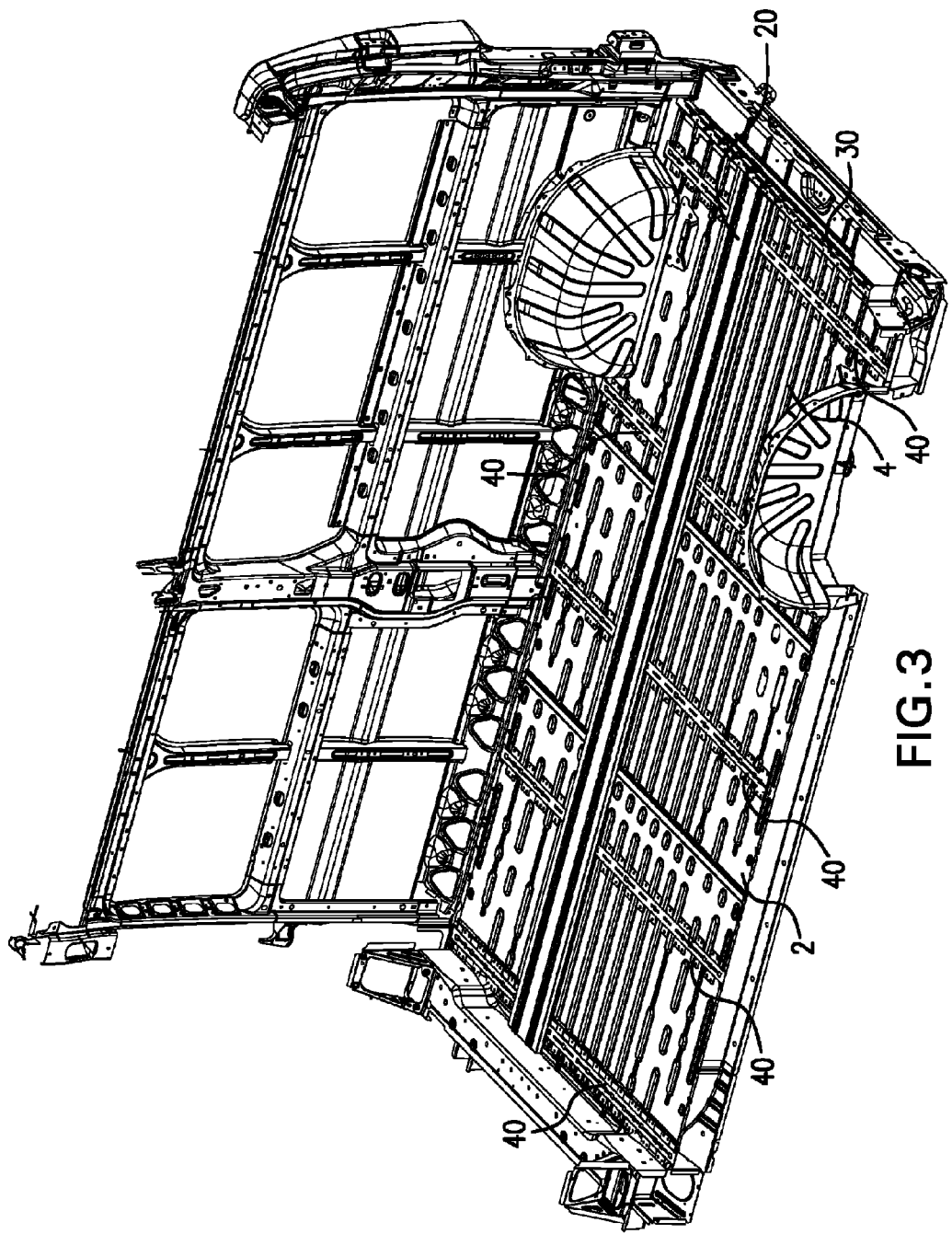
FIG. 3 is a perspective view of the first embodiment of the flooring system in a vehicle after installation of a first flooring panel.
Figure 4:
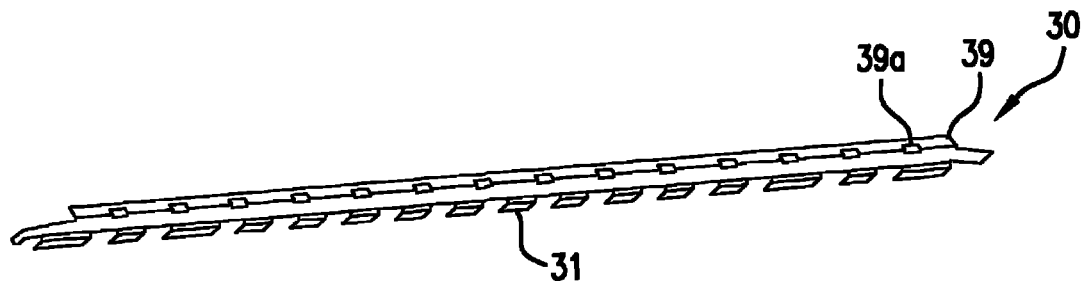
FIG. 4 is a perspective view of a rear registration plate for the first embodiment of the flooring system.
Figure 5:
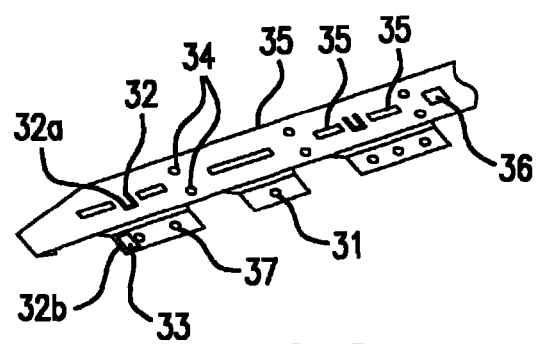
FIG. 5 is a second perspective view of the rear registration plate for the first embodiment of the flooring system, showing its underside.
Figure 6:
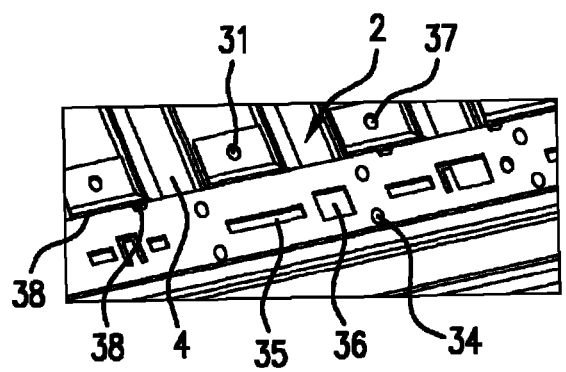
FIG. 6 is a detail view of FIG. 2 showing the positioning of the rear registration plate for the first embodiment of the flooring system on the vehicle floor.
Figure 7:
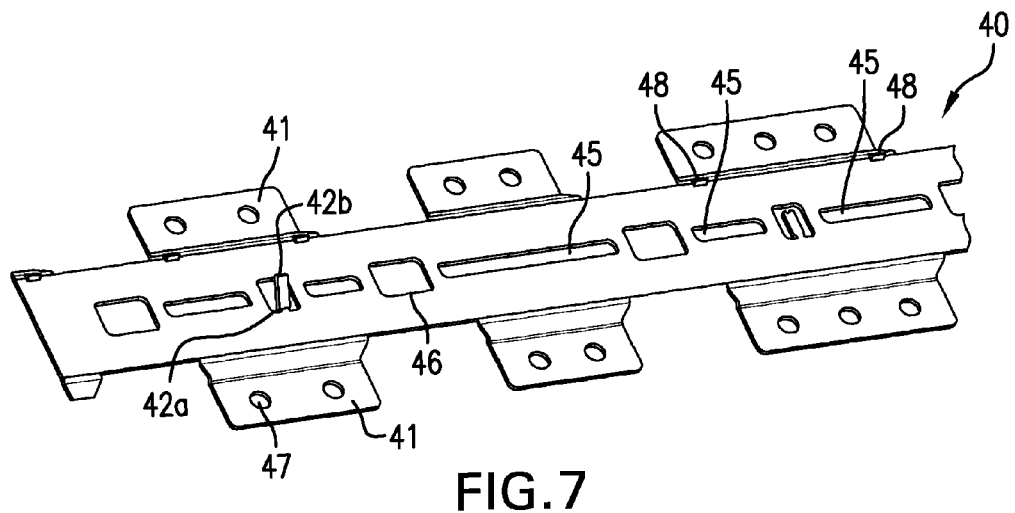
FIG. 7 is a perspective view of a standard registration plate for the first embodiment of the flooring system.
Figure 8:
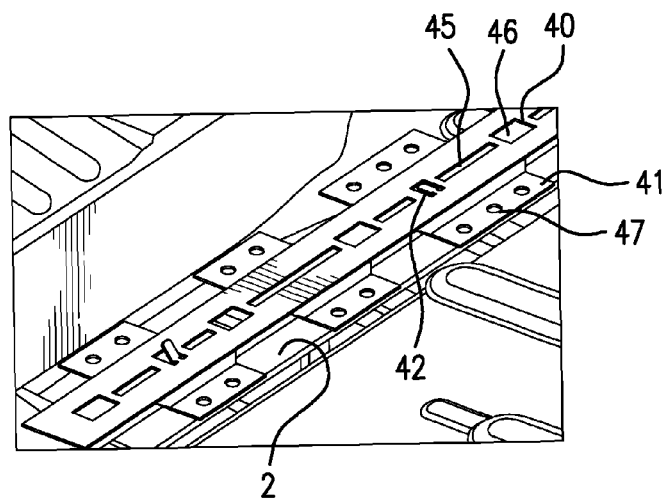
FIG. 8 is a detail view of FIG. 2 showing the positioning of the standard registration plate for the first embodiment of the flooring system on the vehicle floor.

Step 4: Install planks 20. Planks 20 are installed one at a time, using the following method:
 a. Apply the adhesive mastic or other adhesive 55 on the top surface of each rib that will come into contact with one plank 20, as shown in FIG. 2.
 b. Position first plank 20 (preferably a center plank) in place (between adjacent registration tabs 32, 42), and against the vertical lip 39 of the rear registration plate. The plank 20 can be either the integral twin track extrusions 20a or the dual track extrusions 20b with twin open grooves (channels) 24b, as described below. Check that the holes (not shown) in the plank are located toward the rear of the vehicle, over the rear registration plate. They will align with the pilot holes 34 of the rear registration plate and the holes drilled through the floor of the vehicle.

c. Not all planks 20 may be identical. Ensure that each custom fitted plank 20 is placed into the correct position within the vehicle (e.g., planks 20 for left and right wheel-arch cut-outs may differ).

d. Place each plank 20 into position between its corresponding alignment tabs 32, 42.

e. Ensure each plank 20 contacts the vertical lip 39 on the rear registration plate 30 so that longitudinal alignment is attained. This will also ensure hole alignment for the "chicken bolts".

f. Walk over or otherwise apply pressure to the length of each plank 20 to ensure that it is seated with good contact against the adhesive.

g. Complete the planking process. Repeat the adhesive application steps and plank positioning steps until all planks 20 (up to the wheel wells) are laid in their respective places. It is preferable to start in the middle and work toward the edges.

h. Floor the wheel well using, e.g., one of the following two options: (1) by adding two more standard registration plates 40 during step 3 above, one in front of and one behind the wheel well (as shown in FIG. 2), which will allow the installer to index the planks 20 needed to fill the areas directly in front of and behind the wheel wells by bending registration tabs 42 up in that region; or (2) fill the wheel well area with plywood of matching thickness.

Figure 9:
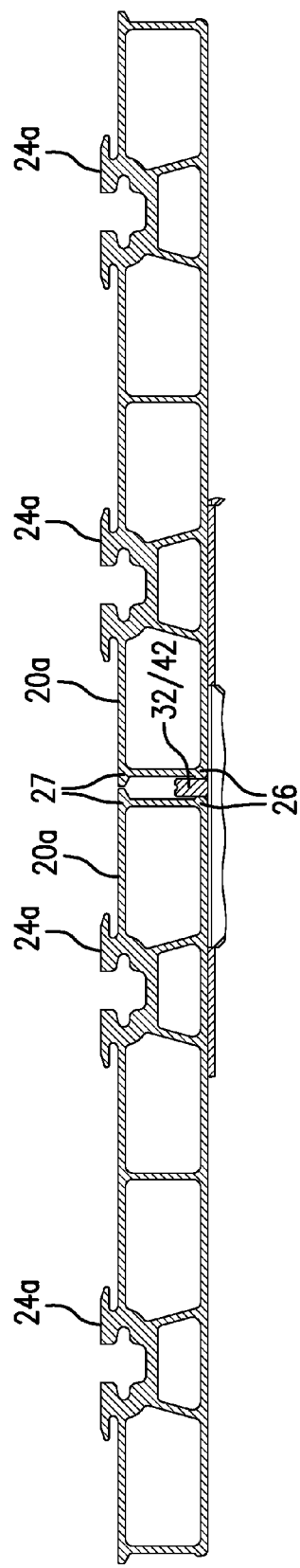
FIG. 9 is a cross-sectional view of adjacent twin-track floor panels, in an installed configuration, that may be used with the first embodiment of the flooring system of FIGS. 1-8 and 11-12.
Figure 10:
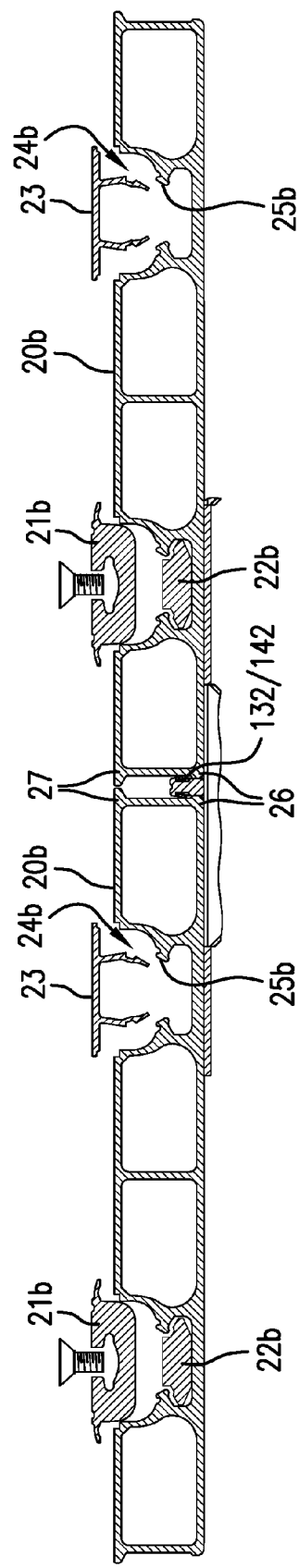
FIG. 10 is a cross-sectional view of adjacent dual-track flooring panels, in an installed configuration, that may be used with the first embodiment of the flooring system of FIGS. 1-8 and 11-12.
Figure 11:
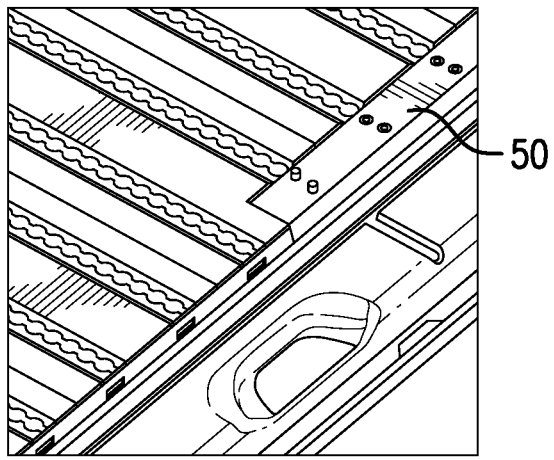
FIG. 11 is a detail view of FIG. 1 showing the positioning of the load bearing sill for the first embodiment of the flooring system; and, FIG. 12 is a perspective view of the underside of the vehicle showing the load spreader plates for the first embodiment of the flooring system.
Figure 12:
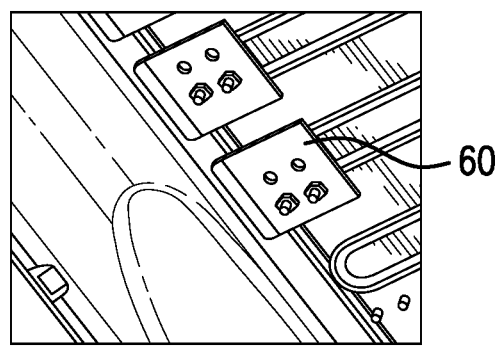

Multiple plank designs may be used, such as the integral twin track plank extrusion 20*a* shown in FIG. 9, the dual track extrusion shown in FIG. 10, or other plank designs that could include any number of tracks or channels. Both plank designs 20*a*, 20*b* have unique edge details that facilitates use with the registration plates. In particular, the lower corners have a slightly protruding detail 26 on each side. These protruding details 26 contact the bent up alignment tabs 32, 42 that are located on the forward most standard registration plate 40 and the rear registration plate 30. As shown in FIG. 10, the alignment tabs 32, 42 can have barbs 132, 142 to engage the protruding detail 26 that will grip the plank 20 and maintain vertical alignment. The upper corner details 27 of the plank may protrude farther than the lower corner details 26. The clearance between planks 20 is maintained at a minimum dimension (e.g., less than 1 mm is preferred), but direct contact may be prevented.

The alignment tabs 32, 42 can be bent down by inserting a thin blade between the two adjacent extrusions 20 and pushing the tabs 32, 42 away from contact with the planks 20, but this should not be done before the adhesive is fully cured.

The dual track (universal) plank extrusion 20*b* has the same perimeter details and dimensions as the integral twin track plank 20*a*, so it can be used interchangeably in the floor system. Both planks have longitudinally-aligned load-bearing structures. The dual track (universal) plank extrusion 20*b*, in particular, has open, load-bearing channels 24*b*, while the twin track plank extrusion 20*a* has load-bearing tracks 24*a*. The dimensional separation (or track pitch) is the same for each profile 20*a*, 20*b*.

The open channels 24*b* have notch features that provide support for a flush plastic filler strip 23. There are lugs 25*b* that engage and "dovetail" with a lock down bar 22*b* to create a solid structure once the flanged track 21*b* is bolted down to the lock down bar 22*b*. The lock-down bar 22*b* is typically as long as the track extrusion, but additional system strength can be gained by increasing the length of the lock-down bar 22*b*. The lock down bar 22*b* has threaded holes that match the pitch and hardware dimension of the holes provided in the flanged "L" track 21*b*.

The open channels 24*b* enable various floor configurations by using either plank extrusion. Furthermore, each channel 24*b* of the dual track (universal) plank extrusion 20*b* can be assembled with a plastic filler strip 23 OR conventional omni flanged "L" track extrusion 21*b* OR a combination of both. In addition, each channel 24*b* can be populated independantly of the other channels 24*b*. The modular feature of the two plank extrusions facilitates cost reductions and weight reductions in many floor system configurations that do not need full tracks.

The ability to create floor layouts with specified mounting hard-points is a further asset. A mounting hard-point is a zone in the vehicle floor that is used to attach either of the following: seat structure, occupant securement or wheelchair securement.

Step 5: (for dual track profiles with open grooves) Accurately mark the desired position of the load bearing "L" tracks 21*b*. Slide bolt-down strips 22*b* into location for each load bearing position (note, there are windows 39*a* in the rear registration plate 30 that facilitate insertion of the bolt-down strips 22*b* after planks 20 have been installed.)

Step 6: Install rear load bearing sill 50 and "chicken bolts" using the following method:

a. Place the Load Bearing Sill 50 over the floor assembly.

b. Insert the chicken bolts through the assembly (the chicken bolts are typically button-head capscrews).

c. Place load spreader plates 60 under vehicle floor, over the protruding chicken bolts.

d. Secure in place with appropriate locking hardware (e.g., lock washer and nut or lock nut).

Step 7: (for dual track profiles 20*b* with open grooves 24*b*) Install filler strips 23 to complete a smooth flat continuous floor surface, leaving the load bearing positions free to receive the "L" track sections 21*b*.

Step 8: Apply an anti-skid surface using manufacturers' recommended bonding process.

Step 9: Trim extra material from edges and from load bearing positions.

Step 10: Install front sill (not shown), if required.

Step 11: (for dual track profiles with open grooves) Install "L" tracks 21*b* into load bearing positions by fastening securely to bolt down strips 22*b*.

Step 12: Test load bearing positions after adhesive has fully cured.

Although the inventions described and claimed herein have been described in considerable detail with reference to certain embodiments, one skilled in the art will appreciate that the inventions described and claimed herein can be practiced by other than those embodiments, which have been presented for purposes of illustration and not of limitation. Therefore, the spirit and scope of the invention should not be limited to the description of the embodiments contained herein. It should be understood that the arrangements described herein are for purposes of example only. As such, those skilled in the art will appreciate that other arrangements and other elements can be used instead, and some elements may be omitted altogether. Further, many of the elements may be implemented as discrete or distributed components or in conjunction with other components, in any suitable combination.

We claim:

1. A flooring system comprising:
   a plurality of flooring panels, each having a longitudinal axis; and,
   a first registration member and a second registration member, each having a plurality of locating members that are collectively configured to position the plurality of flooring panels in parallel along the longitudinal axis.

2. The flooring system of claim 1 in which each the plurality of flooring panels has a first end, wherein the first registration member includes an alignment member that is configured to engage the plurality of flooring panels to align their first ends.

3. The flooring system of claim 2 wherein the alignment member is a lip.

4. The flooring system of claim 3 wherein the lip includes a plurality of access windows that are configured to permit access into a longitudinally-aligned load-bearing structure of the plurality of flooring panels after installation on the first and second registration members.

5. The flooring system of claim 1 in which each of the plurality of flooring panels has an upper surface and a plurality of stand-off members, wherein the stand-off members are configured to support the plurality of flooring panels in vertically spaced-arrangement with the upper surface.

6. The flooring system of claim 1, wherein a plurality of spaced-apart support members depend from each of the first registration member and the second registration member, whereby the plurality of spaced-apart support members are configured to be disposed between a plurality of raised ribs of a sub-floor.

7. The flooring system of claim 6, wherein the support members include ports.

8. The flooring system of claim 6, wherein an underside of at least some of the support members include adhesive tape.

9. The flooring system of claim 1, wherein the plurality of locating members are tabs integrally formed into the first and second registration members.

10. The flooring system of claim 9, wherein the tabs are bendable between a retracted, non-use position and an extended, use position.

11. The flooring system of claim 10, wherein the tabs include a neck.

12. The flooring system of claim 10, wherein an end of the tabs includes a recess.

13. The flooring system of claim 1, wherein the first and second registration members include a plurality of adhesive windows being spaced along the lengths of the first and second registration members.

14. The flooring system of claim 1, wherein the first and second registration members include a plurality of vents being spaced along the lengths of the first and second registration members.

15. The flooring system of claim 1 further comprising a sill member, wherein the sill member, the plurality of flooring panels, and the first registration member all include a plurality of holes configured to be axially aligned and to receive a fastener.

16. The flooring system of claim 1, wherein at least some of the plurality of flooring panels include a longitudinally-aligned load-bearing structure.

17. The flooring system of claim 16, wherein the load-bearing structure is a universal channel configured to receive at least one of a filler strip and a flanged track.

18. The flooring system of claim 16, wherein the load-bearing structure is an integrated load-bearing track.

* * * * *